US005658498A

United States Patent [19]

Driskill

[11] Patent Number: 5,658,498

[45] Date of Patent: Aug. 19, 1997

[54] ELECTROCHEMICAL FOR RETARDING ELECTROLYSIS BETWEEN DISSIMILAR METALS IN ELECTRICAL CIRCUITS

[76] Inventor: Carl R. Driskill, 3330 Kathy La., Irving, Tex. 75060

[21] Appl. No.: 705,184

[22] Filed: Aug. 29, 1996

Related U.S. Application Data

[63] Continuation-in-part of Ser. No. 489,833, Jun. 13, 1995, abandoned.

[51] Int. Cl.[6] .......... C09K 3/00; C11D 1/00

[52] U.S. Cl. .......... 252/388; 252/387; 510/175; 510/255; 510/401; 510/104; 510/106; 510/109; 422/7; 134/42

[58] Field of Search .......... 252/388, 387; 510/175, 255, 401, 463, 109, 267, 106, 104; 422/7; 134/42

[56] References Cited

U.S. PATENT DOCUMENTS

| | | | |
|---|---|---|---|
| Re. 33,210 | 5/1990 | Stoufer | 188/145 |
| 2,850,461 | 9/1958 | Bloch et al. | 252/364 |
| 3,876,762 | 4/1975 | Rabussier et al. | 424/78 |
| 4,362,639 | 12/1982 | Eoga | 252/99 |
| 4,368,189 | 1/1983 | Mentlik | 424/81 |
| 4,460,488 | 7/1984 | Grollier et al. | 252/89.1 |
| 4,483,783 | 11/1984 | Albanese | 252/312 |
| 4,867,800 | 9/1989 | Dishart et al. | 234/40 |
| 4,983,224 | 1/1991 | Mombrun et al. | 134/40 |
| 5,084,200 | 1/1992 | Dishast et al. | 252/173 |
| 5,120,371 | 6/1992 | Bolden et al. | 134/40 |
| 5,176,749 | 1/1993 | Costello et al. | 106/237 |
| 5,190,679 | 3/1993 | McDonald | 252/41 |
| 5,196,136 | 3/1993 | Dishalt et al. | 252/170 |
| 5,238,504 | 8/1993 | Henry | 134/40 |
| 5,277,836 | 1/1994 | Peters | 252/143 |
| 5,395,548 | 3/1995 | Peahl, Jr. et al. | 252/162 |
| 5,403,507 | 4/1995 | Henry | 252/170 |
| 5,482,645 | 1/1996 | Marayama et al. | 252/170 |

FOREIGN PATENT DOCUMENTS

WO92/10314 6/1992 WIPO .

OTHER PUBLICATIONS

Kirk–Othmer, Encyclopedia of Chem. Technology, (3d ed.), vol. 16, pp. 307–333 (1981).

*Primary Examiner*—Sharon Gibson
*Assistant Examiner*—Deanna Baxam
*Attorney, Agent, or Firm*—David W. Quimby

[57] ABSTRACT

An aqueous cleaning fluid is provided for retarding electrolysis between dissimilar metals in an electrical circuit and removing contaminates and metal said from electrical conductors. This reduces resistance within the circuit and increases circuit efficiency. The fluid is a complex of naturally occurring essential oils mixed with a surfactant mixture to form a concentrated solution. The concentrated solution is diluted with distilled water and drying agents to levels suitable for application in field operations at or near a job site. The cleaning fluid is applied to conductors within a circuit with a spray bottle. The electrical circuit is taken off line, the conductor surfaces are exposed, and the conductor surfaces are wetted with cleaning fluid until some of the cleaning fluid drips from the conductor surface. Then the circuit is reassembled and the circuit is put on line.

6 Claims, No Drawings

ELECTROCHEMICAL FOR RETARDING ELECTROLYSIS BETWEEN DISSIMILAR METALS IN ELECTRICAL CIRCUITS

This application is a continuation-in-part of the inventor's earlier patent application entitled "Cleaning Fluid And Method For Reworking Electrical Circuits," which has Ser. No. 08/489,833, and was filed on Jun. 13, 1995, now abandoned.

BACKGROUND OF THE INVENTION

1. Field of the Invention

This invention relates to the cleaning of electric circuits. More specifically, the invention relates to a cleaning fluid and method for removing metal salts and contaminants from conductor surfaces in electrical circuits.

Electricians have ordinary skill in the art.

2. Description of Related Art

In commercial and industrial applications, electric circuits and systems are formed by connecting electrically conducting ends of wires to connectors. A connection can be made to equipment, to a different wire, or to a bus. In general, wires and connectors are made of copper or aluminum, but they can also be made of alloys of copper or aluminum. Connectors can be made of other conductors such as steel, or other metals and alloys.

Over a period of time the electrical circuit can lose efficiency due to corrosion and contamination at the various connections. The environment surrounding a circuit influences the length of time that passes before the loss of efficiency in an electric circuit becomes noticeable. In high salinity areas, such as areas close to an ocean or a sea, and in high humidity areas, it does not take much time to notice a loss of efficiency in an electrical circuit.

Loss of efficiency in a circuit is often caused by corrosion, which is the formation of metal salts and the presence of other contaminants at a connection. Metal salts are very poor conductors or non-conductors. Metal salts on a conductor at a connection act like a resistor and reduce the flow of electricity through the connection. In extreme cases, corrosion may prevent the flow of electricity through a connection, causing an open circuit. Corrosion at a connection may cause heat generation because of increased impedance in the circuit, and can lead to fire. A significant loss of efficiency in a circuit or system due to corrosion requires that the circuit or system be reworked.

There are five primary methods for reworking electrical circuits and systems in commercial and industrial applications. The first method is a complete rewiring of an electrical system or circuit with all new electrical equipment and new lines or conductors. The disadvantage of this method is that it is extremely costly; much more costly than the installation of the original electrical system.

The second method is to disconnect a wire from a connector, cut off a corroded section of the wire, strip a section of the insulation so the wire can be reconnected to the connector, and reconnect the wire to the connector. This method is limited by the length of the wire originally installed.

The third method is to disconnect a wire from a connector and dip the wire in acid to remove corrosion from the wire. The wire would then be reconnected to the connector. This method increases the reliability of an electrical system; however, it costs a significant amount of electrical energy because it reduces the wire size, therefore acting as a resistor in line. For those lines that have heavy loads, this may be critical and actually cause the lines to fall below the national electrical code on size of wires relating to load.

The fourth method is to loosen the conductors or wires from the connectors and to abrade the conductors or wires with a steel brush or sandpaper to remove corrosion. The conductors or wires are then reconnected to the connectors. This method produces a more reliable electrical circuit and is generally used where reliability is extremely important; however, the method leaves abrasion marks on the conductor. The abrasion marks create more conductor surface area, and corrosion reoccurs more rapidly, especially in a humid or high-salinity environment.

The fifth method is one that is used on high voltage power lines. Calcium salts are sprayed on the conductors to remove and replace oxidized copper or aluminum salts and other corrosion compounds that exist at connections. The disadvantage of this method is that the spray promotes electrolysis between dissimilar metals, and upon drying, the spray leaves large mounts of the calcium based compounds or salts as residue. These residues are non-conductors in dry form. Furthermore, when this method is used, it must be repeated very frequently.

In the manufacture of copper and aluminum wiring, petroleum based oils are left on the wires to prevent oxidation of the wire. These oils are an impediment to the flow of electricity when the wire is connected to an electrical circuit. The impedance can generate heat, which can cause a fire since petroleum based oils are generally flammable.

There are many different cleaning fluids. One type of cleaning fluid uses terpenes as a solvating agent. U.S. Pat. No. 5,238,504, issued to Henry, discloses a terpene and ketone blend. This cleaning solution is a non-aqueous solution which can be used to clean electrical contacts.

U.S. Pat. No. 5,277,836, issued to Peters, discloses a cleaning compound which uses a terpene, a polyalkoxylated alcohol, and water. The compositions have improved grease cutting and rust inhibiting abilities. The composition has a terpene concentration of at least 10% by weight, so that the compositions have good grease cutting abilities. U.S. Pat. No. 5,190,679, issued to McDonald, discloses an aqueous loosener composition for removing cable from a conduit. The composition includes a lubricating agent; a solvating agent, such as a terpene; and water. Because the solvating agent is used to loosen "frozen" cables from a conduit wall, the solvating agents are present in high concentrations. At high concentrations, aqueous terpene solutions will corrode aluminum and copper conductors.

SUMMARY OF THE INVENTION (1) Progressive contribution to the art

I have invented a cleaning fluid and a method for reworking electrical circuits. The cleaning fluid reduces contaminates and metal salts on a conductor without significantly corroding the conductive surfaces of the electrical circuits. This reduces the resistance within a circuit, thereby increasing the efficiency of the circuit. The treatment of the electrical circuit retards electrolysis between dissimilar metals in an electrical circuit. This allows for a longer time period to pass before the electrical circuit must be treated again. The cleaning fluid comprises a complex of essential oils mixed with surfactants, drying agents, and diluted with distilled water. The essential oils are present in dilute amounts, typically less than 0.10% by weight in the dilute solutions used to treat electrical conductors, so that the cleaning fluid will not corrode the aluminum and copper conductors being treated.

The combination of various essential oils and the preparation method are key aspects of the cleaning fluid. The concentrations of essential oils are adjusted for specific environments. For example, higher concentrations of eucalyptus oil and rosemary oil are used when it is known that the cleaning fluid is to be used in a harsh environment, such as a high salinity environment.

The preparation method of the fluid is also important. If the temperature of the essential oils exceeds 400 Celsius during the initial combination and mixing of the essential oils, the resulting fluid is useless because the resulting cleaning fluid will not have good cleaning properties, nor will the cleaning fluid retard electrolysis between dissimilar metals in an electrical circuit.

The cleaning fluid is placed in a spray bottle which is capable of producing a fine mist. To rework a circuit, the circuit is taken off-line, and conducting surfaces of the circuit are exposed. This may involve disassembling the circuit. The cleaning fluid is sprayed onto the conducting surfaces to be treated until the surfaces are thoroughly wetted. Additional cleaning fluid is sprayed until at least several drops of the cleaning fluid drip from the conductor surface. Then the conductor surface is allowed to dry. The circuit is reassembled and the circuit is put back on-line.

(2) Objects of this invention

An object of this invention is to provide an improved means for reducing contaminates and metal salts from existing electrical circuits and systems.

Another object is to provide an electrochemical material that is water soluble and biodegradable.

Another object is to provide a cleaning fluid that in dilute form retards electrolysis between dissimilar metals, especially copper and aluminum.

A further object is to provide a cleaning fluid concentrate that is stable when stored in a proper manner for several years, and when diluted is stable in the field for even greater period of time.

Still another object of this invention is to provide a reduction in sulfation and other reactions of anions on copper, aluminum and other metals or alloys.

Another object is to help restore contacts between metals in electric circuits and systems through the removal of metal salts from the surfaces of common conducting metals, such as salts of copper and aluminum.

DESCRIPTION OF THE PREFERRED EMBODIMENTS

The cleaning fluid is prepared in a concentrated form. The cleaning fluid is shipped and stored as a concentrate to reduce transportation and storage expenses. The cleaning fluid concentrate is diluted at or near a job site with distilled water and drying agents. Depending upon specific conditions of an electrical system, dilution adjustments can be made to efficiently cope with specific environments.

The cleaning fluid concentrate is prepared by combining two aqueous fluid mixtures. The first fluid mixture comprises a mixture of essential oil complexes. The second fluid mixture comprises a mixture of other solvents and surfactants.

The first fluid mixture is made by charging a stainless steel vessel with a mixture of essential oil complexes in the following weight percentage ranges: oil of rosemary 8% to 15%, oil of cypress 11% to 27%, oil of mint 6% to 17%, oil of eucalyptus 4.5% to 7.8%, oil of clove 9% to 31% and the remaining portion is distilled water. This mixture is then heated for 72 hours under 15 pounds of pressure, at a temperature of 39° C. The temperature should not be allowed to rise above 40° C. At the end of the 72 hours, add by volume five times the original volume with distilled water. This additional volume of water is added and mixed with the original volume and the mixture is continuously stirred for a period of 20 minutes, while maintaining the temperature at substantially 39° C.

The second fluid mixture comprises an aqueous mixture of compounds to further aid in solvating contaminants and corrosion products on conductor surfaces, to increase the viscosity of the cleaning fluid, and to act as surfactants. Such compounds include low molecular weight alcohols and ketones, alkyl glycol ethers, ethoxylated alcohols, and ethoxylated phenol alcohols. The low molecular weight alcohols and ketones should be from the following group: methanol, ethanol, propanol, isopropanol, acetone, and methyl ethyl ketone; and mixtures thereof. A preferred embodiment of the second fluid mixture comprises the following weight percentage ranges: isopropyl alcohol 15% to 20%, octylphenoxy polyethoxy ethanol 2% to 8%, diethylene glycol monobutyl ether 4.8% to 8.9%, butyl cellusolve 2.5% to 4.7%, and the remaining portion is distilled water. The mixture is made by charging a stainless steel vessel with distilled water and slowly mixing in the other components while continuously stirring. The mixture should be stirred for at least 40 minutes.

To make the cleaning fluid concentrate, 24% to 43% by weight of the first fluid mixture is added to the second fluid mixture and the resulting fluid mixture is stirred for 20 to 30 minutes.

The concentrated cleaning fluid is diluted at or near a job site with distilled water and a drying agent. The drying agent can be any low molecular weight alcohol or ketone which will decrease the time required for the dilute cleaning fluid to dry after the cleaning fluid has been applied to a conductor. The preferred drying agent is isopropyl alcohol because of its availability.

A dilution ratio of 50 to 100 parts of distilled water and 0 to 50 parts drying agent to one part concentrate should be used. The concentrated cleaning fluid or a less dilute cleaning solution can be used if the conductor being treated has significant visible corrosion. If a concentrated cleaning solution is used, copious amounts of water should be applied to any treated conductor after treatment, or residual cleaning fluid could corrode the conductor being treated.

The dilute cleaning fluid has a pH of about 6.7. The dilute cleaning fluid can be packaged in polyethylene bottles. Packaging in other plastic containers is not recommended. The cleaning fluid is easily applied to a conductor with a spray applicator that produces a fine mist.

The cleaning fluid is biodegradable. The cleaning fluid is non-flammable and non-combustible when diluted to field strength. The cleaning fluid will conduct electricity. The cleaning fluid dries with little or no residue. The cleaning fluid should be stored in a protected location away from frost, direct sunlight, and intense heat to avoid evaporation and alteration prior to application.

To use the cleaning fluid to remove manufacturing oils or to rework a conductor, the diluted cleaning fluid is placed in a spray bottle. The power to the conductor is turned off and the area of the conductor to be cleaned is exposed. This may require disassembly of the electrical circuit. Preferably, the cleaning fluid is sprayed over the entire exposed conductor in sufficient quantity to leave the electrical conductor completely wet, and at least several drops of cleaning fluid should drip from the applied area. Alternatively, the cleaning fluid can be poured onto the electrical circuit. The cleaning fluid dissolves the metal salts, and the dripping fluid carries away the dissolved salts and contaminants.

Application of the electrochemical fluid on existing electrical circuits helps remove existing degradation by removing metal salts. When applying to existing electrical systems, the electrical system must be brought off line because the cleaning fluid conducts electricity. Removing metal salts decreases the resistance at a connection. Treatment effectiveness depends upon the deterioration and the operating environment of the electrical circuit. The cleaning fluid removes oils, contaminates, and metal salts that impede the flow of electricity within an electric circuit without reacting with the copper and/or aluminum wires or conductors.

A problem that occurs over the years with connections made of dissimilar metal conductors and/or connectors is electrolysis of the metals. It has been observed that the application of the cleaning fluid retards electrolysis. The application of the cleaning fluid retards the migration of atoms onto or into electrical connections of dissimilar metals. With time electrolysis will still occur; however, retarding this natural process helps to save electricity that would otherwise be wasted. The cleaning fluid also reduces sulfation and other ionic reactions on copper, aluminum and other metals or alloys.

The following example relates to a cleaning composition of the present invention:

The aqueous based composition was made by the following procedure: into a stainless steel reactor vessel with a protective pressure valve set at 15 pounds of pressure was placed 266 ml (milliliters) oil of rosemary, 300 ml oil of cypress, 165 ml oil of mint, 112 ml oil of eucalyptus, 271 ml oil of clove, and 1280 ml of distilled water. This mixture was heated to 39° C. and held at this temperature with slightly less than 10 pounds of pressure (psig) for 72 hours. Care was taken to never reach 40° C. After the 72 hours, 10.5 liters of distilled water at a temperature of 39° C. was added to the mixture. This mixture was mixed at atmospheric pressure for 20 minutes, while the temperature was maintained at 39° C. This formed the first fluid mixture.

Into a second stainless steel vessel, 20 liters of distilled water was placed, and 3.5 liters of isopropyl alcohol, 720 ml of octylphenoxy polyethoxy ethanol, 1.12 liters of butyl carbitol, and 800 mg (milligrams) of ethylene glycol monobutyl ether were mixed with continuous stirring. This mixture was then heated quickly to 68° C. and continuous stirring was applied for an hour. This formed the second fluid mixture. The second fluid mixture was allowed to cool to 40° C. before mixing with the contents of the first mixture in the reaction vessel.

The first fluid mixture was mixed 25 parts by volume to 75 parts by volume of the second fluid mixture. The mixture was continuously mixed without the addition of heat until the mixture temperature was below 30° C. This mixture was the concentrated solution.

The mixture was transported to the field where 1 part of the concentrate was mixed with 70 parts of distilled water and 15 parts of isopropyl alcohol to form a dilute solution. The dilute solution was used to treat fresh cut and stripped copper and aluminum conductors and their connectors or terminals. The dilute solution was applied to wiring in a cattle feeding operation. The air of the environment was slightly salty and contained ammonia. The dilute solution retarded the electrolysis process for a period of 8 years on the treated conductors and connections. Untreated conductors had visible electrolysis from the dissimilar metals of copper and aluminum and additional corrosion at the distribution panel connections and other connections closer to the motors. The voltage drop on the untreated conductors was at least 90% greater than in the treated connections in all cases examined in the field test.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A cleaning fluid which retards electrolysis between dissimilar metals in an electrical circuit and removes contaminates and metal salts from electrical conductors comprising:

a) about 0.3 to 1.1 weight % oil of rosemary;

b) about 0.4 to 2.0 weight % oil of cypress;

c) about 0.2 to 1.25 weight % oil of mint;

d) about 0.15 to 0.6 weight % oil of eucalyptus;

e) about 0.35 to 2.25 weight % oil of clove;

f) about 8 to 15 weight % of a solvent consisting of methanol, ethanol, propanol, isopropanol, acetone, methyl ethyl ketone, and mixtures thereof;

g) about 1 to 6 weight % of a surfactant;

h) about 4 to 13 weight % of alkyl glycol ethers; and i) water.

2. The cleaning fluid of claim 1 wherein said surfactant comprises an ethoxylated phenol alcohol.

3. The concentrated cleaning fluid of claim 2 wherein said surfactant comprises octylphenoxy polyethoxy ethanol.

4. The concentrated cleaning fluid of claim 1 wherein said alkyl glycol ethers comprises diethylene glycol monobutyl ether, ethylene glycol monobutyl ether, and mixtures thereof.

5. The cleaning fluid of claim 1 in diluted form wherein one part of said cleaning fluid is diluted with up to 100 parts of water.

6. The cleaning fluid of claim 1 in diluted form wherein one part of said cleaning fluid is diluted with up to 100 parts of water, and with up to 50 parts of a drying agent selected from from the group consisting of methanol, ethanol, propanol, isopropanol, acetone, methyl ethyl ketone, and mixtures thereof.

* * * * *